C. E. SAMPSON & W. WOODS.
CRUDE OIL SEPARATOR COLUMN.
APPLICATION FILED OCT. 7, 1914.
1,151,290.
Patented Aug. 24, 1915.
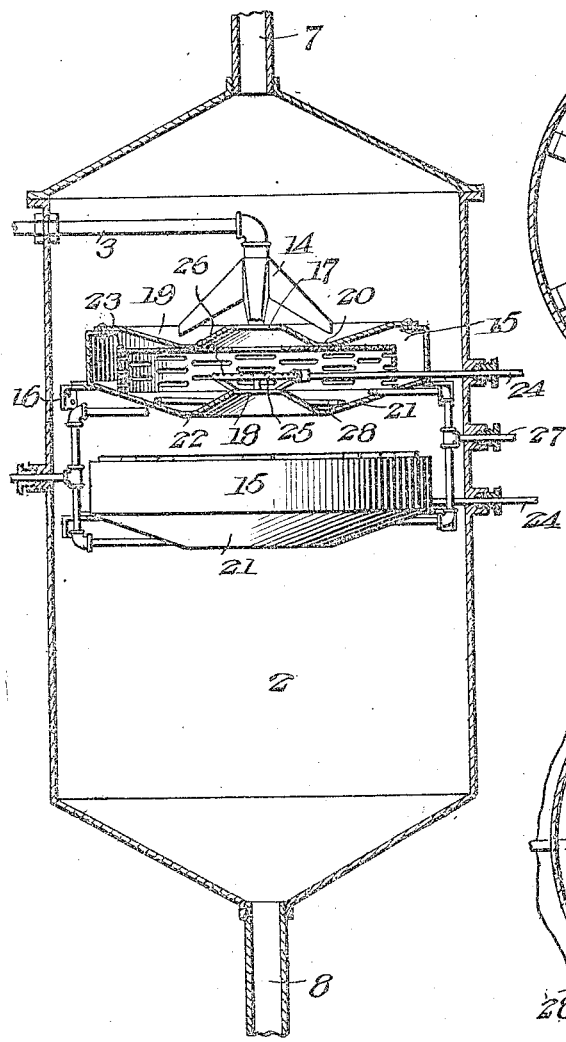
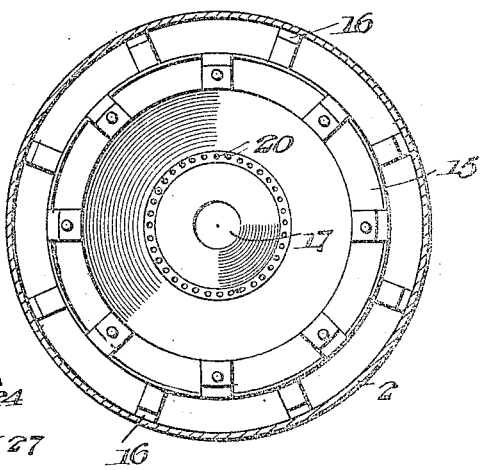
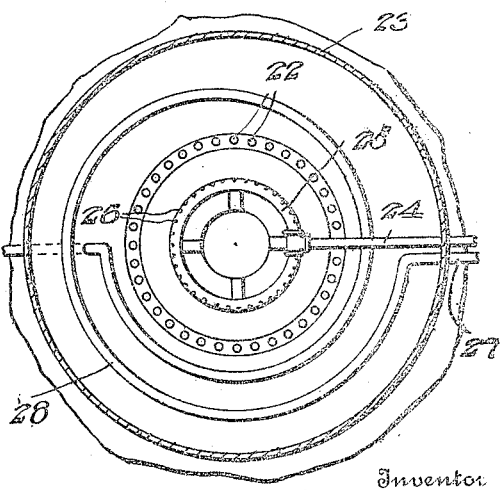
Witnesses
Hugh Hett
K. Peacock
Inventor
Carlos H. Sampson
Walter Woods
By Victor J. Evans
Attorney

UNITED STATES PATENT OFFICE.

CARLOS E. SAMPSON AND WALTER WOODS, OF SHALE, CALIFORNIA.

CRUDE-OIL SEPARATOR-COLUMN.

1,151,290.             Specification of Letters Patent.      Patented Aug. 24, 1915.

Application filed October 7, 1914. Serial No. 865,554.

*To all whom it may concern:*

Be it known that we, CARLOS E. SAMPSON and WALTER WOODS, citizens of the United States, residing at Shale, in the county of Kern and State of California, have invented new and useful Improvements in Crude-Oil Separator-Columns, of which the following is a specification.

This invention relates to crude oil separator columns and it consists in the novel features hereinafter described and claimed.

An object of the invention is to provide means for efficiently separating gas from crude oil in order that the gas may subsequently be condensed into liquid form.

In the accompanying drawings, Figure 1 is a vertical sectional view of the separator column. Fig. 2 is a horizontal sectional view of the separator column. Fig. 3 is a detailed sectional view through one of the pans of the separator column.

Supported within the body of the separator column 2 is a series of separating pans 15 and as these pans are of the same form and design a description of one will answer. The pans 15 are preferably circular in form and are spaced from the side walls of the separator 2 and supported upon brackets 16 attached to the side walls of the said separator body. Each pan is provided in its top with a central opening 17 and in its bottom with a central opening 18. The top of the pan 15 is further provided with a depression 19 which surrounds the opening 17 and the top of the pan is provided at the bottom of the depression 19 with a series of openings 20. The bottom of the pan 15 is provided with an annular depression 21 which surrounds the opening 18 and the bottom of the pan is provided at the bottom of the said depression with a series of openings 22.

An inverted perforated pan 23 is located within the pan 15 and rests at its edge upon the bottom of the pan 15. The upper portion of the inverted pan 23 is interposed between the openings 17 and 18 of the pan 15. The discharge ends of the nozzles 14 are disposed above and slightly within the depression 19 of the uppermost pan 15. The openings 20 of the pan are disposed approximately vertically above the depression 21 of the next adjacent lower pan. A pipe 24 passes transversely through the side of the body of the separator 2 and through the side of the adjacent pan 15 and is provided at its inner end with a ring 25 which is concentrically positioned with relation to the pans 15 and 23. The ring 25 is provided with upwardly and outwardly disposed discharge openings 26 directed toward the upper intermediate portion of the pan 23 and beyond the openings 20 in the pan 15. The pan 23 is provided with perforations 23' in its sides as well as in its top as clearly shown in Fig. 1 of the drawing. A pipe 27 passes transversely through the sides of the separator 2 and also passes through the lower portion of the pans 15 and is provided with a coil 28 which is located in the depressions 21 of the pan 15. When the crude oil and gas enters the separator 2 through the pipe 3 the said material is divided by the nozzles 14 into small streams and is permitted to gravitate into the depression 19 of the uppermost pan 15. At the same time superheated air, superheated steam or a mixture of air and steam is passed through the pipe 24 into the ring 25 and from the openings 26 this air or mixture of air and steam is directed outwardly toward the upper intermediate portion of the inverted pan 23. The oil and gas which is received in the depression 19 of the uppermost pan passes down through the opening 20 in the top of the pan in the form of a thin curtain and consequently it is encountered by the blast of steam, air or mixture of air and steam and is driven toward the outer portion of the pan 23. The gas passes through the upper portion of the pan 23 while the liquid oil passes down along the sides of the pan 23 and enters the depressions 21 in the bottom of the pan 15. The gas thus separated from the oil passes through the upper portion of the pan 23 and up and out through the central opening 17 in the pan 15 into the upper portion of the body 2 and is then passed out through the pipe 7. When the liquid oil passes down into the depression 21 the steam which is passing through the coil 28 from the pipe 27 gives off heat which tends to gasify this oil and consequently a further separation is effected. The gas rises and passes through the inverted pan 23 and out through the opening 17 as hereinbefore described while the liquid oil drops into the depression 19 of the next adjoining pan 15 below and the operation just above described is repeated. This separation may be continued in the separator column as often as desired. Therefore it will be seen that a still apparatus is provided which is efficient in its operation and which effectually separates the gas from crude oil.

Having described the invention what is claimed is:—

1. A separator column comprising a body having outlets at its upper and lower portions, means for admitting oil and gas into the upper portion of the body, a pan located in the body and provided in its top with a depression and having an opening which is surrounded by said depression, said pan also having at the bottom of the said depression openings, the oil admitting means adapted to deposit oil in the said depression, said pan having in its bottom a central opening surrounded by a depression and provided at the bottom of the said depression with openings, an inverted perforated pan located in the first mentioned pan and resting at its edge upon the bottom of the same and means for admitting fluid pressure into the inverted perforated pan.

2. A separator column comprising a body, a pipe leading into the body, a plurality of nozzles provided upon the pipe, a pan located in the body and provided in its top with a central opening surrounded by a depression having in its bottom openings, said nozzles being disposed above said depressions, said pan having in its bottom a central opening surrounded by a depression and provided at the bottom of the last mentioned depression with openings, means for admitting fluid pressure into the pan, means for heating the area inclosed within the depression in the bottom of the pan, and an inverted perforated pan located in the first mentioned pan and resting at its edge upon the bottom thereof and having an intermediate portion located below the openings in the depressions in the top of the first mentioned pan.

3. A separator column comprising a body, means for admitting oil into the body, a pan located in the body and having in its top a central opening with a depression surrounding said opening and provided at the bottom of said depression with openings, said pan having in its bottom a central opening with a depression surrounding the last mentioned opening and having at the bottom of the last mentioned depression openings, an inverted perforated pan located in the first mentioned pan and having an intermediate portion located below the openings in the depression in the top of the first mentioned pan, means for admitting fluid pressure into the inverted perforated pan and adapted to liberate the same toward the upper intermediate portion of the said perforated pan and means for conducting a heating fluid through the lower portion of the first mentioned pan.

In testimony whereof we affix our signatures in presence of two witnesses.

CARLOS E. SAMPSON.
WALTER WOODS.

Witnesses:
C. G. NOBLE,
GEO. MOLIDOR.